United States Patent
Didcock et al.

(10) Patent No.: US 9,424,401 B2
(45) Date of Patent: Aug. 23, 2016

(54) AUTOMATED LICENSE MANAGEMENT

(75) Inventors: Clifford Didcock, Sammamish, WA (US); Corinne Pascale, Bellevue, WA (US); Jono Luk, Bellevue, WA (US); Girish Chander, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/421,825

(22) Filed: Mar. 15, 2012

(65) Prior Publication Data
US 2013/0247209 A1    Sep. 19, 2013

(51) Int. Cl.
*G06F 21/00* (2013.01)
*G06F 21/10* (2013.01)

(52) U.S. Cl.
CPC .............. *G06F 21/105* (2013.01); *G06F 21/00* (2013.01)

(58) Field of Classification Search
USPC .............................. 726/26, 28, 31; 705/59, 34
See application file for complete search history.

(56) References Cited

U.S. PATENT DOCUMENTS

| | | | |
|---|---|---|---|
| 2005/0049973 A1 | 3/2005 | Read et al. | |
| 2007/0016532 A1* | 1/2007 | Zhang et al. | 705/59 |
| 2007/0198428 A1 | 8/2007 | Satkunanathan et al. | |
| 2008/0083040 A1 | 4/2008 | Dani et al. | |
| 2009/0037337 A1* | 2/2009 | Baitalmal et al. | 705/59 |
| 2009/0119779 A1* | 5/2009 | Dean et al. | 726/26 |
| 2009/0132310 A1 | 5/2009 | Shear et al. | |
| 2009/0187995 A1* | 7/2009 | Lopatic | 726/31 |
| 2011/0083177 A1 | 4/2011 | Eddahabi et al. | |
| 2011/0251937 A1 | 10/2011 | Falk et al. | |

OTHER PUBLICATIONS

"Microsoft Office 365, Manage Licenses", Retrieved at<<http://onlinehelp.microsoft.com/en-us/office365-enterprises/gg570315.aspx>>, Retrieved Date Dec. 22, 2011, pp. 4.
"JTB FlexReport", Retrieved at <<http://www.jtbworld.com/jtbflexreport/index.htm>>, Retrieved Date: Dec. 23, 2011, pp. 26.

* cited by examiner

*Primary Examiner* — Jeffrey Pwu
*Assistant Examiner* — Samuel Ambaye
(74) *Attorney, Agent, or Firm* — Aneesh Mehta; Doug Barker; Micky Minhas

(57) ABSTRACT

Licenses to software services are assigned automatically to users as a function of one or more user attributes. An attribute can include membership in a group such as a license group or a security group, among other things such as location. License assignments can also be retracted automatically upon changes in one or more user attributes.

20 Claims, 7 Drawing Sheets

AUTOMATED LICENSE MANAGEMENT

BACKGROUND

Usage of software is governed by software licenses. A software license is a legal instrument that permits a licensee to do that which a licensor otherwise has a right to prevent. The rights of licensors are derived from intellectual property law including copyright and potentially patent rights associated with the software. Rather than selling all rights and interests in software, software vendors typically sell licenses to users granting permission to use the software subject to various terms and conditions. As a result, a software vendor maintains ownership of the software and associated intellectual property, and customers can derive benefits afforded by the software. A license also provides a software vendor with a mechanism to monetize software by way of a license fee.

The emergence of cloud computing provides an opportunity for improved license enforcement. Cloud computing generally refers to delivering computing, including hardware and software, as a service rather than a product. Software products traditionally have rudimentary, if any, license enforcement mechanism. Accordingly, a customer can declare a number of software users, and a software vendor collects licensing revenue for that number of users. Cloud computing can enable much more accurate license enforcement. In particular, service can be provided in accordance with a subscription that provides a number of access licenses. In this manner, if a subscription supplies one-hundred licenses for a software service and two are used, the customer has ninety-eight licenses remaining. This mechanism is beneficial to customers, because they know they are in compliance in terms of their agreement with a software vendor, and this mechanism is good for software vendors since they receive revenue to which they are entitled.

In enterprises, administrators are responsible for managing licenses. Using a portal or command-line capability, an administrator can assign a license to a user or retract a license from a user. For instance, if a new employee joins a company, an administrator can assign a license to that user. Alternatively, if an employee leaves a company, a license for that user can be retracted and potentially assigned to a subsequent new employee.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to automated license management. Rather than requiring explicit license assignment, licenses to software services can be assigned automatically as a function of one or more user attributes. In accordance with one particular aspect of this disclosure, a user attribute can indicate membership in a group such as a license group or security group. License assignments can also be retracted automatically based on a change to at least one of the one or more user attributes. Mechanisms are also provided for identifying and resolving license assignment conflicts, among other things.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Conventionally, administrators for cloud software services explicitly assign licenses to users to enable them to access the service. In some cases, a company may purchase multiple subscriptions that grant different levels of access to the same service or for different stock keeping units (SKUs) which contain the same service. The administrator will strive to assign licenses from the correct subscription using criteria such as cost-center, location, department, discipline, and level, among other things. This causes considerable administrative overhead for the administrators of the system. Further, errors can result where users are assigned multiple licenses and consume resources purchased by different departments or cost centers. Consider, for example, the case where a company purchases a one-hundred-seat subscription for a high-end e-mail service for office workers and a two-hundred-seat subscription for a low-end e-mail service (e.g., web mail only) for factory workers, and an administrator assigns these seats explicitly to these sets of people. Subsequently, if the company purchases a subscription to a personal computer management tool that they want to be used by all three-hundred employees, the administrator will need to assign licenses to all three-hundred employees.

Details below are generally directed toward automated license management. Licenses can be assigned to users automatically as a function of one or more user attributes. An administrator can set up rules that define how licenses are assigned based on user attributes including but not limited to membership in groups such as a license group or security group. Licenses can then be automatically assigned utilizing the rules. After initial assignments, changes are processed (including overrides to 'opt out' of this automated assignment). Licenses can be retracted automatically, for example, upon changes in user attributes, and retracted licenses subsequently become candidates for reassignment. Mechanisms are also provided for addressing license assignment conflicts, among other things.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
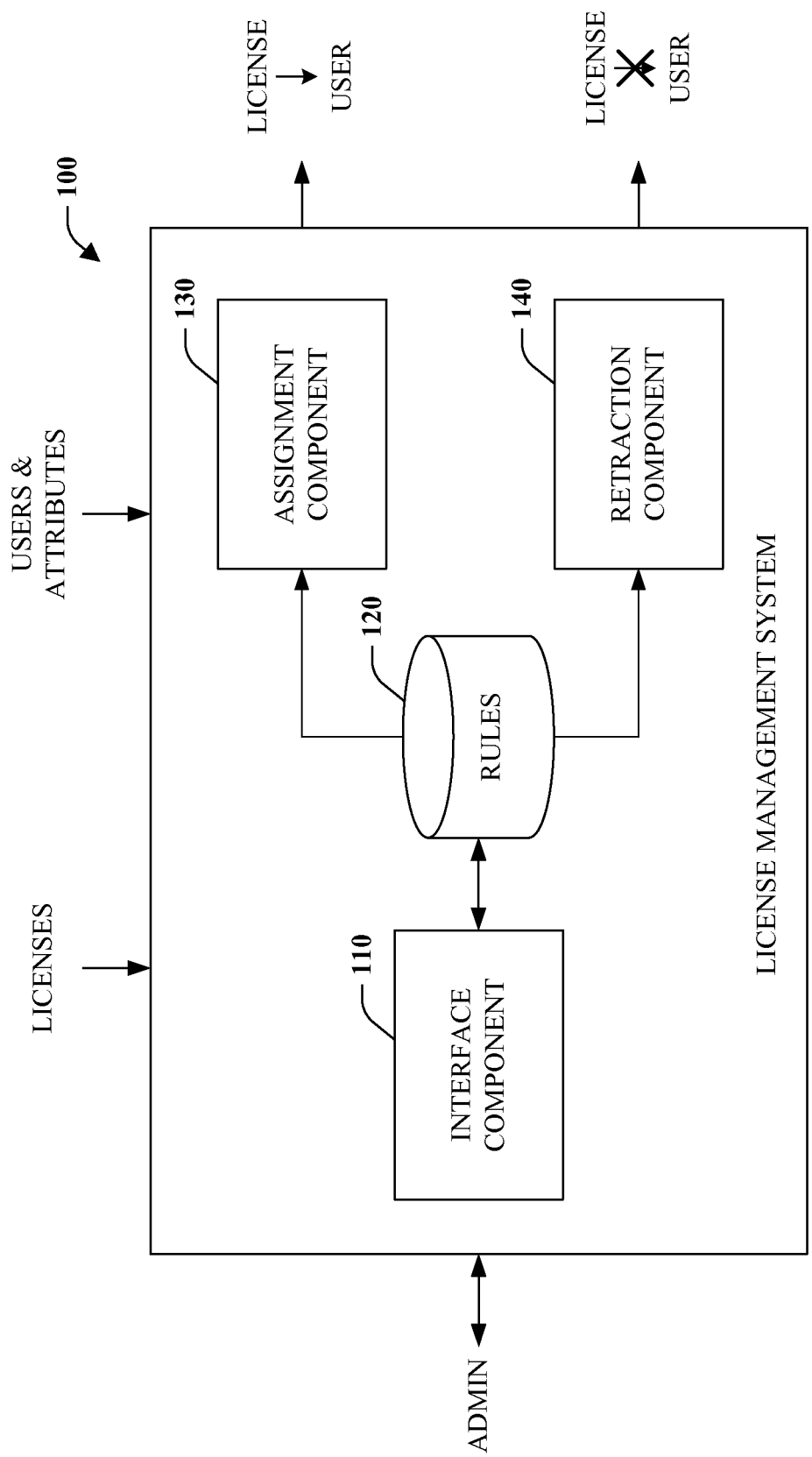
FIG. 1 is a block diagram of a license management system.

Referring initially to FIG. 1, license management system 100 is illustrated. The license management system 100 is configured to automatically assign, revoke, and reassign licenses, among other things, for cloud computing software, or in other words, software services. The license management system 100 can thus exploit delivery of computation as a service, rather than as a product, in managing licenses that provide access to the service. Licenses in this context can be provided as part of a subscription to a particular service. By way of example, and not limitation, a company can subscribe to an e-mail service, and as part of that subscription, the company can receive one hundred licenses. Here, each license can correspond to an available mailbox that can be assigned to an employee of the company. The license management system 100 can facilitate initial assignment of licenses to employees and subsequently operate in a change mode such that licenses are retracted for employees that leave the company or who no longer meet the rules for that license. These retracted licenses can be reassigned to new or other employees automatically.

The license management system 100 includes interface component 110, rules 120, assignment component 130, and retraction component 140. The interface component 110 is configured to enable an administrator, or like user, to interact with the license management system 100. Further, rules 120 can be specified by way of the interface component 110. The rules 120 specify conditions, or criteria, for license assignment and conversely, license retraction. In accordance with one embodiment, the rules can be specified with respect to one or more user attributes, where an attribute defines a quality or characteristic of a user. As examples, an attribute can be user name, e-mail address, title, role, location, or membership in a group, among other things. The assignment component 130 is configured to assign a license to a particular user automatically as a function of one or more user attributes. More specifically, the assignment can be performed based on the existence of a user attribute (e.g., Boolean) or the value of a user attribute (e.g., attribute-value pair). Further, where the attribute is group membership, in one instance a group can be analyzed to determine if the user is a member. If the rules 120 indicate that a license should be assigned to a user with particular attributes and a user has those particular attributes then a license will be assigned. Otherwise, a license will not be assigned. By way of example, a rule can be expressed as "IF user attribute 'department' equals 'finance' THEN Assign." The retraction component 140 is configured to retract a previously assigned license to a user automatically based on changes in one or more user attribute. More particularly, the retraction component 140 can retract a license if a user no longer satisfies conditions for license assignment. Alternatively, retraction specific rules can be specified with respect to at least user attributes that specifies when and under what conditions license retraction is to be performed.

Figure 2:
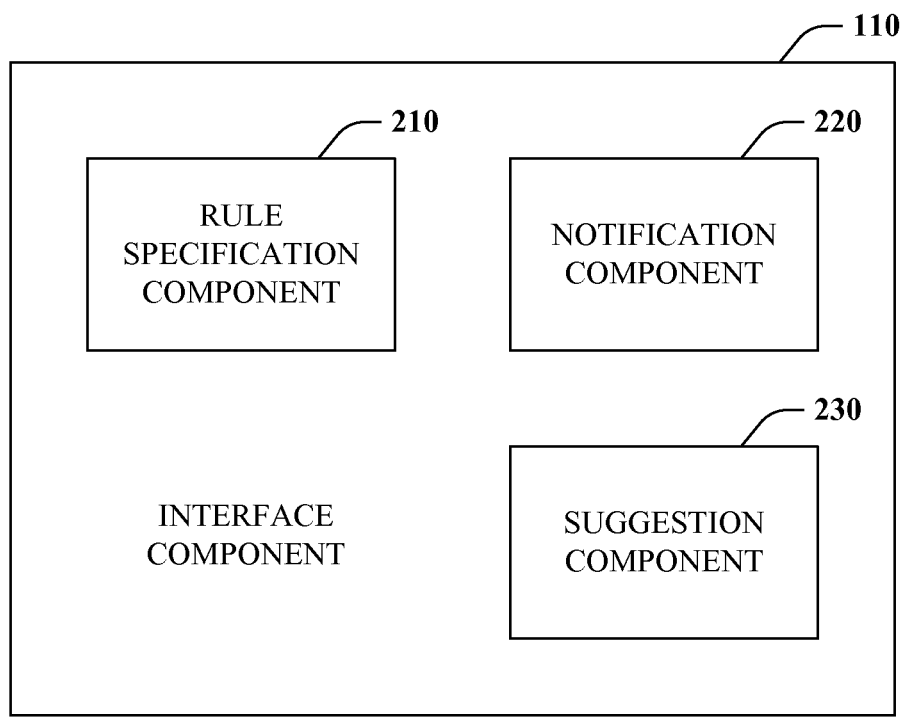
FIG. 2 is a block diagram of a representative interface component.

FIG. 2 depicts an exemplary interface component 110 in further detail. As previously mentioned, the interface component 110 allows interaction with the license management system 100 by an administrator, for example. In accordance with one embodiment, the interface component 110 can be a user interface such as a graphical user interface. Alternatively, the interface component can be embodied as an application programming interface (API) that enables other systems, such as a command line system (e.g., Windows PowerShell®), to interact with and employ the functionality of the license management system 100. In either situation, data can be provided to and received from an administrator, or like user, by way of the interface component 110. The interface component includes rule specification component 210, notification component 220, and suggestion component 230.

The rule specification component 210 is configured to facilitate specification of rules with respect to user attributes. In one instance, a user can specify rules manually. By way of example, an administrator can specify "IF user attribute 'role' equals 'manager' THEN Assign." Alternatively, the rule specification component 210 can enable graphical rule specification by way of drag and drop or drawing lines between user attributes and a set of licenses, among other things. Further, drop-down menus, or the like, can be provided to select licenses or user attributes, and text entry boxes can be employed to enter valid patterns with the user attributes.

The notification component 220 is configured to notify an administrator, or like individual or entity, of a particular circumstance and optionally request a response. For example, an administrator can be notified that a license assignment is about to be retracted. The administrator can then grant or deny permission to perform such retraction. Similarly, and as will be discussed later herein, an administrator can be notified of a license assignment conflict and optionally specify a resolution of the conflict. Notifications themselves can take any form including instant messages, e-mail, or pop-up boxes within a graphical user interface, among many others.

The suggestion component 230 is configured to make suggestions to administrators based on known or inferred conditions. By way of example, and not limitation, if there are a limited number of licenses outstanding for a particular service and it can be determined or inferred from context information that more licenses are going to be needed shortly, a suggestion can be made to the administrator to purchase more licenses.

Figure 3A:
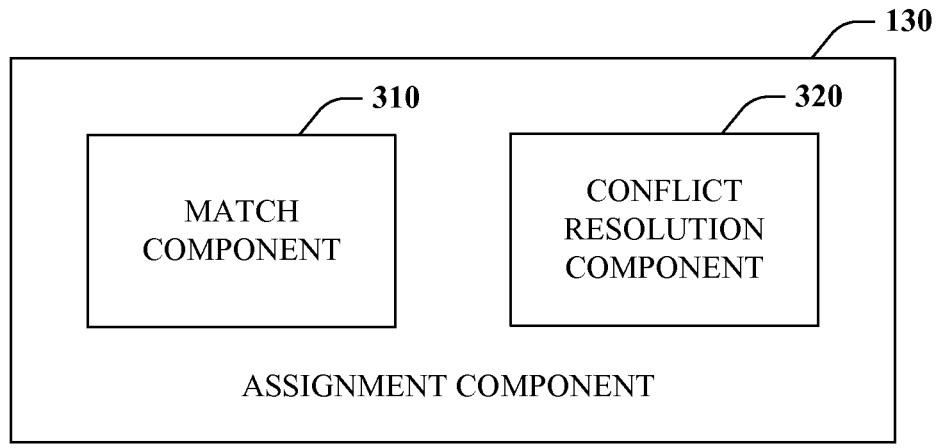
FIG. 3A is a block diagram of a representative assignment component.

FIG. 3A shows a representative assignment component 130. Recall, the assignment component 130 is configured to assign licenses to users based on one or more user attributes. The assignment component 130 includes match component 310 configured to match licenses to users. More specifically, the match component 310 can identify when rule criteria is satisfied for a particular license or set of licenses with respect to a user as a function of one or more user attributes. For example, if a rule specifies that a license is dependent upon a particular user role or function within a company and a user has that particular role or function, a match has been detected. Subsequently, a license can be assigned, if one is available.

Conflict resolution component 320 is configured to identify and resolve conflicts with respect to license assignment. The conflict resolution component 320 can be configured to identify at least two types of conflicts, namely those that concern license compatibility and those that pertain to license scarcity. Once identified, the conflict resolution component 320 can employ a variety of resolution techniques. For example, the conflict resolution component can seek to resolve the conflict automatically, for example based on one or more conflict resolution rules. Additionally or alternatively, an administrator can be notified and requested to resolve a conflict.

A conflict can exist if a user qualifies for two or more incompatible licenses. Licenses can be deemed incompatible if they are associated with two or more of the same or like services (e.g., different levels of access to the same service, different versions of the same service . . . ). For instance, if a company has subscriptions to two different e-mail services or two different subscriptions to the same e-mail service of a different level, the licenses are incompatible, as a user needs, or may be permitted, access to only one e-mail service. The conflict resolution component 320 can apply conflict resolution rules to resolve the conflict automatically and/or an administrator can be notified and solicited to resolve the conflict.

By way of example, consider a situation in which a company subscribes to two different e-mail services, namely a high-end e-mail service (e.g., full featured) and a low-end e-mail service (e.g., reduced features). Further, assume that the company desires to supply office workers with the high-end service and factory workers with the low-end e-mail service. Thus, rules can specify licenses associated with the high-end service be assigned to office employees and licenses associated with the low-end service be assigned to factory employees. A situation may exist where a factory manager, for instance, is both an office worker and a factory worker. Accordingly, the factory manager would qualify for licenses to both e-mail services. In this case, a rule can exist that allows the conflict resolution component 320 to resolve the conflict automatically in favor of assigning the high-end service or per the older license assignment rule. Alternatively, an administrator can be solicited to resolve the conflict by way of the interface component 110. Still further yet, the administrator can be provided with a recommended resolution and asked for approval.

A conflict can also exist when the number of candidates for a license, or eligible users, exceeds the number of licenses available. For example, if there are a hundred candidates for a particular software service and there are only seventy-five licenses available a determination needs to made concerning to whom licenses should be assigned. Here, precedence rules authored by an administrator can specify a precedence hierarchy or the like that can be used to resolve such a conflict. For example, rules might be based on a first-in first-out precedence or where the most senior employees are provided with license first. Other rules are also possible and contemplated such as giving licenses to full-time employees first, part-time employees second, followed by other business partners. In other words, various heuristics can be employed to determine to whom to assign a license in view of a limited number of licenses.

Figure 3B:
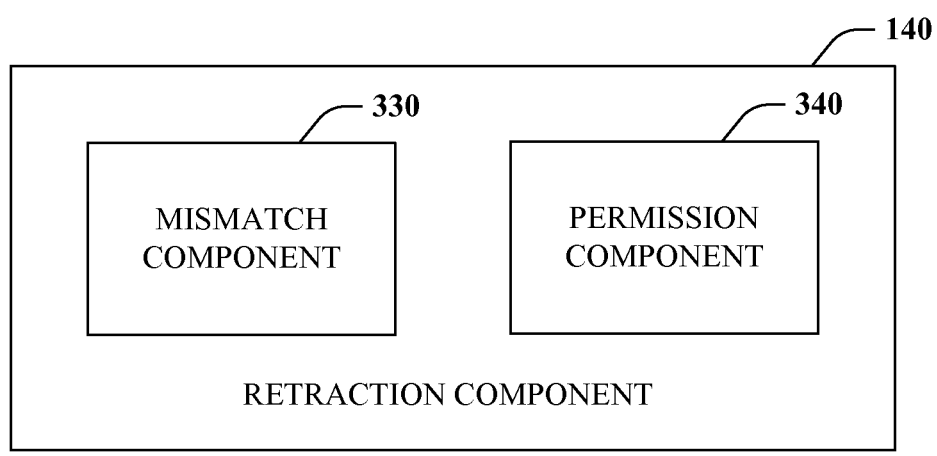
FIG. 3B is a block diagram of a representative retraction component.

FIG. 3B illustrates a representative retraction component 140, which is configured to retract license assignment to a user. Mismatch component 330 is configured to identify a user license assignment that is no longer valid. More specifically, the mismatch component 330 can determine when criteria for license assignment are unsatisfactory due to a change in one or user attributes. By way of example, consider a scenario where a license assignment is dependent upon a user having an organizational user name, and upon termination of employment, the user name is deleted. As another example, a user might change roles from a factory worker to an office worker thus qualifying for different service. In any event, there is a mismatch between license assignment criteria and a pertinent user attribute. As such, the retraction component 140 can automatically retract a license. The retraction component 140 can additionally or alternatively operate with respect to specific retraction rules in contrast to determining when criteria for license assignment is no longer valid.

It is recognized that deletion of a license can potentially result in an unwanted loss of data if rules are not defined precisely. For example, if an employee moves from one group in a company to another, the license should not be retracted and potentially and subsequently reassigned. To address, this situation the retraction component 140 can wait a predetermined amount of time before retracting a license. Additionally or alternatively, permission component 340 can be employed. The permission component 340 can be configured to request permission from an administrator, for instance, prior to retracting a license. If the administrator grants permission, the license can be retracted. Otherwise, the license assignment will remain.

In accordance with one embodiment, a user attribute can be membership in a group. In this case, an administrator can make a rule that links licenses to a group such that members of the group are candidates for license assignment while non-members are not. Groups can be populated automatically using existing tools or manually by an administrator.

A group can be an existing group such as a security group or a special group created for the purposes of license management, herein called a license group. Existing groups can be part of an enterprises existing infrastructure, for example. License groups can be generated by an administrator for purposes of managing licensing. For example, an administrator can initially group a set of company employees into particular groups based how software licenses are to be distributed. In the running example, a company distributes different versions of an e-mail service to office employees and factory employees. Here, an administrator can create two groups, namely an office group and a factory group, and link the subscription for the high-end e-mail service to the office group and the low-end e-mail service to the factory group.

Figure 4:
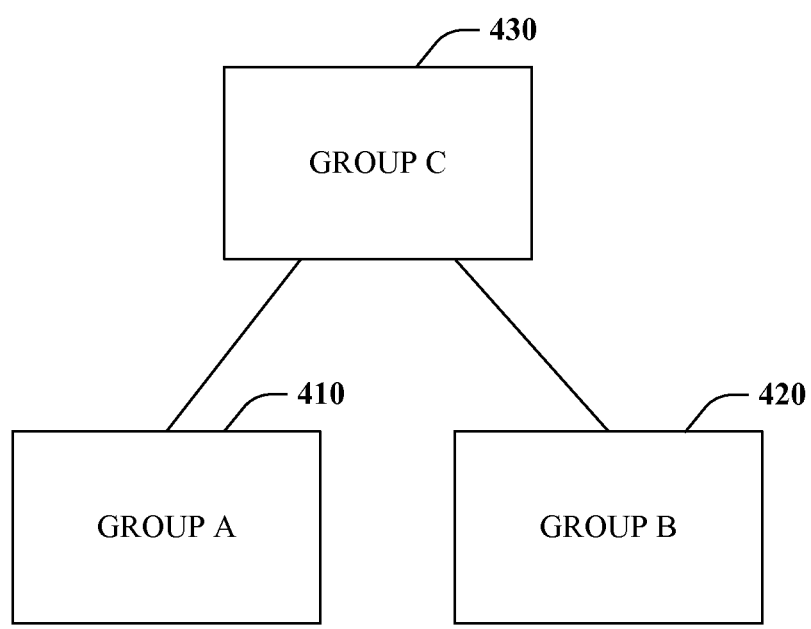
FIG. 4 is a block diagram of groups of groups.

Groups can also be linked together such that members of multiple groups are eligible for license assignment. As shown in FIG. 4, there can be two independent groups: group A 410 and group B 420. These two groups can be linked together by way of group C 430. Accordingly, group C includes members of group A 410 and group B 420. For example, group A 410 can be an office group capturing office employees and group B 420 can be a factory group including factory employees. In this case, group C 430 can correspond to the superset representing all employees of the company. As another example, consider a merger of two companies where a first company has a one-hundred-license subscription to a software service and a second company has a fifty-license subscription to the same software service. Here, the first company can correspond to group A 410 and the second company can correspond to group B 420. Upon merger, the new company corresponding to group C 430 can include group A 410 and group B 420 and thus a has one-hundred and fifty license subscription to the software service. A similar technique can be utilized with respect to a divestiture, for example, where Group C 430 is split into group A 410 and group B 420.

The license management system 100 can be integrated with existing enterprise systems and practices. For example, the license management system 100 can acquire user attributes by way of a directory service (e.g., Active Directory, eDirectory, Open Directory . . . ) that stores and organize user and machine information to enable authentication and authorization of users and computers within a network, for example. As a result, a new employee onboarding process that adds users to security groups, among other things can trigger automatic license assignment with respect to software services. Similarly, an employee exiting process can trigger automatic license revocation.

The rules 120 can also deal with a scenario where a company is not consuming as many licenses as they purchased. Here, rules can be defined as to when to sell back licenses and/or reduce the number of licenses allocated for subsequent billing cycles. Further, this process can be performed automatically by the license management system 100 by interacting with supporting software vendor infrastructure.

Note also that the license management system 100 can include system rules 120 that cannot be overridden. These system rules 120 can correspond to business rules/logic that prevent license assignment or require license retraction in certain scenarios. For example, the system rules 120 can specify that licenses cannot be assigned to users that reside in a particular country subject to a trade embargo. Accordingly, even if the user is otherwise eligible for a license, the user will be deemed ineligible on this basis alone. Stated differently, there is a conflict that cannot be resolved. Furthermore, various licensing scenarios are supported. As used herein thus far a license is based on users or user seats. In this case, a license provides a single user access to a service. Alternatively, a license can be device based. In other words, a license is required for every device that accesses the service regardless of the number of users of the device. Alternatively, a license can be based on resource consumption (such as storage or bandwidth in GB, or compute cycles).

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the license management system can utilize such mechanism to optimize license assignment when there are more users than licenses and to resolve conflicts with respect to incompatible licenses, among other things.

Figure 5:
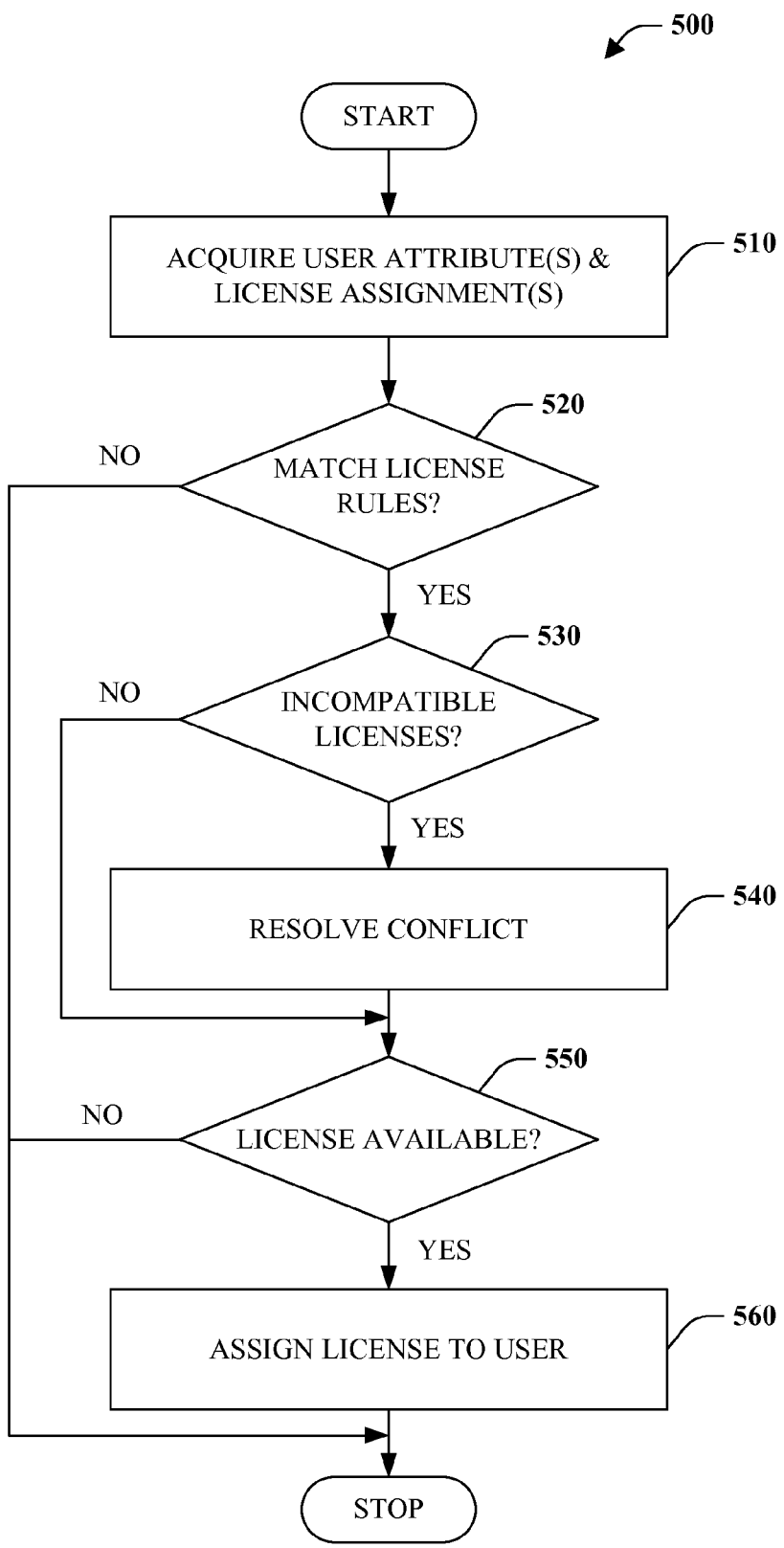
FIG. 5 is a flow chart diagram of a method of license assignment.
Figure 6:
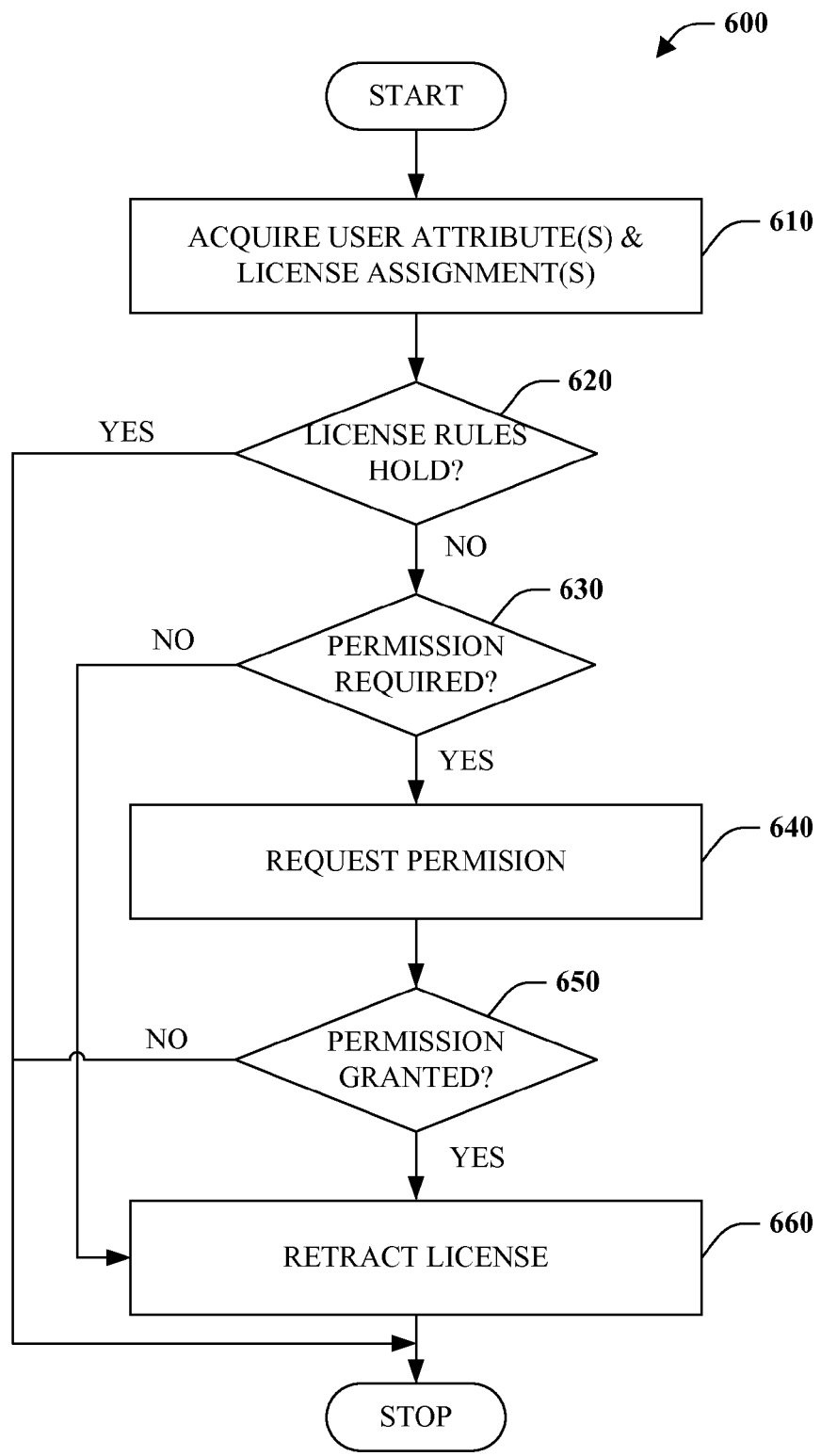
FIG. 6 is a flow chart diagram of a method of license retraction.

In view of the exemplary systems described supra, methodologies that may be implemented in accordance with the disclosed subject matter will be better appreciated with reference to the flow charts of FIGS. 5 and 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 5, a method 500 of license assignment is illustrated. At reference numeral 510, one or more user attributes and one or more current licenses assignments (or the number thereof) are received, retrieved, or otherwise acquired for a particular user. User attributes can include things such as, but not limited to, user name, e-mail address, title, role, location, and membership in a group. At reference numeral 520, a determination is made as to whether rules or criteria associated with one or more licenses match with respect to the acquired one or more user attributes. Stated differently, the determination pertains to whether or not licenses are available to a user given the one or more user attributes. If there are no matches ("No"), the method terminates. If there is at least one match ("YES"), the method proceeds to make a determination as to whether licenses available to the user are incompatible. Here, incompatible can refer to licenses with respect to two or more like software services for which a user is likely to only need access to one rather than more than one (e.g., e-mail service, customer relations management service . . . ) If available licenses are incompatible ("YES"), the conflict is resolved at reference numeral 540. The conflict can be resolved automatically based on rules associated with incompatible software services, semi-automatically based on administrator input, for example based on a predefined preference, or manually based on administrator selection. Subsequently the method can proceed to 550. Similarly, if there are no incompatible licenses at 530 ("NO"), the method can proceed directly to 550, where a determination is made concerning whether there are licenses available in light of those provided with a subscription and those that are currently assigned. If licenses are available at 550 ("Yes"), the method can proceed to 560, where one or more licenses are assigned to the user. If, however, there are no licenses available at 550 ("NO"), the method can simply terminate without assignment. A message can optionally be sent to an administrator indicating that a user qualified for a license but there were no available licenses to assign.

FIG. 6 is a flow chart diagram of a method 600 of retracting a license assignment. At reference numeral 610, one or more attributes and one or more license assignments associated with a user are received, retrieved or otherwise obtained or acquired. At numeral 620, a determination of whether license rules or criteria hold with respect to licenses assigned to the user. In other words, the determination concerns whether the user attributes are such that if a license were not already assigned to the user one would be assigned. Absent any changes to user attributes the license rules should still hold. However, a change in user attributes may result in the licensing rules not being satisfied. If the rules hold ("YES"), the method can terminate. If the rules do not hold with respect to one or more license assignments ("NO"), a determination is made at 630 as to whether permission is required to retract the one or more license assignments. If permission is required ("YES"), permission is requested, for example from an administrator, at 640 and a determination is made at 650 as to whether permission was granted. If permission is not granted at 650 ("NO"), the method terminates. If, however, permission is not required at 630 ("NO") or permission is granted at 650 ("YES"), the method continues at 660 where one or more licenses are retracted.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
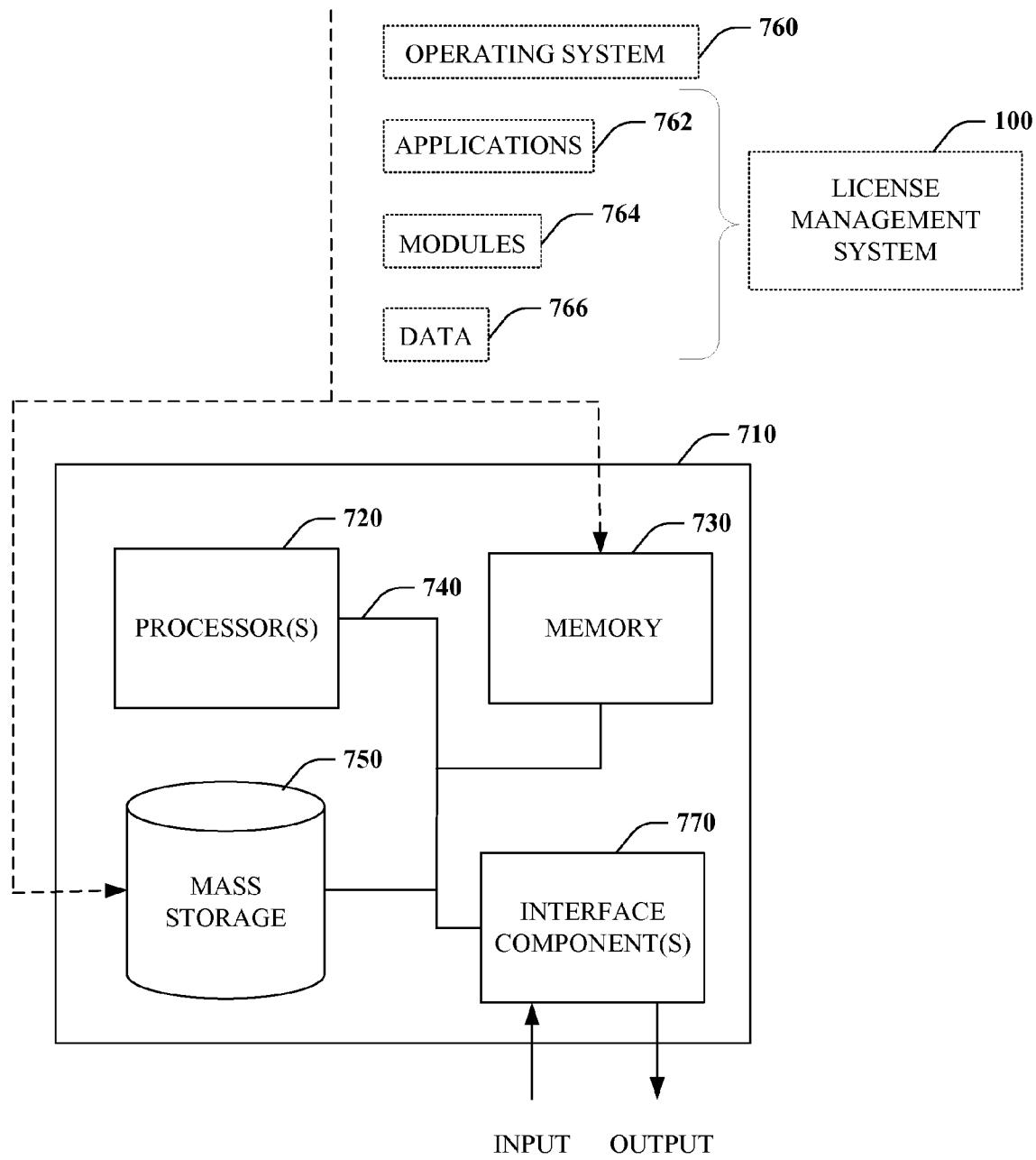
FIG. 7 is a schematic block diagram illustrating a suitable operating environment for aspects of the subject disclosure.

In order to provide a context for the claimed subject matter, FIG. 7 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 7, illustrated is an example general-purpose computer 710 or computing device (e.g., desktop, laptop, server, hand-held, programmable consumer or industrial electronics, set-top box, game system . . . ). The computer 710 includes one or more processor(s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to facilitate control of the computer 710 to implement one or more aspects of the claimed subject matter. The computer-readable media can be any available media that can be accessed by the computer 710 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 710.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 710. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the license management system 100, or portions thereof, can be, or form part, of an application 762, and include one or more modules 764 and data 766 stored in memory and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the license management system 100 and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g., serial, parallel, PCMCIA, USB, FireWire . . . ) or an interface card (e.g., sound, video . . . ) or the like. In one example implementation, the interface component 770 can be embodied as a user input/output interface to enable a user to enter commands and information into the computer 710 through one or more input devices (e.g., pointing device such as a mouse, trackball, stylus, touch pad, keyboard, microphone, joystick, game pad, satellite dish, scanner, camera, other computer . . . ). For instance, an input device can capture user gestures or voice commands. In another example implementation, the interface component 770 can be embodied as an output peripheral interface to supply output to displays (e.g., CRT, LCD, plasma . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, implemented at a license management computer system that includes at least one processor configured to execute computer-executable instructions stored in a memory, for assigning licenses to users, the method comprising:
   receiving, from a remote computer system, a set of a plurality of software licenses assigned to an organization associated with the license management computer system;
   identifying one or more license rules that specify criteria for assigning licenses in the set of software licenses to users within the organization, at least one particular license rule specifying one or more values of at least one attribute that must be matched for the particular license rule to apply;
   identifying a particular user within the organization to which the particular license rule applies, based at least on determining that a value of an attribute associated with the particular user matches the one or more values of the at least one attribute specified by the particular license rule;
   identifying that a conflict exists with respect to assigning the particular license to the particular user, the conflict including at least one of a license incompatibility and license scarcity;
   determining a resolution to the conflict based on at least one of user input and a rule-based conflict resolution; and
   assigning a particular license of the set software licenses to the particular user based at least on having identified the particular user within the organization to which the particular license rule applies and based at least on having determined the resolution to the conflict.

2. The method of claim 1, wherein the one or more values of the at least one attribute that must be matched for the particular license rule to apply comprises a user group membership.

3. The method of claim 1, wherein the one or more values of the at least one attribute that must be matched for the particular license rule to apply comprises a license group membership.

4. The method of claim 1, wherein the one or more values of the at least one attribute that must be matched for the particular license rule to apply comprises a security group membership.

5. The method of claim 1, further comprising acquiring the attribute associated with the particular user from a directory service.

6. The method of claim 1, wherein determining the resolution to the conflict comprises performing the rule-based conflict resolution when the particular user qualifies for two or more incompatible licenses.

7. The method of claim 1, wherein determining the resolution to the conflict comprises performing the rule-based conflict resolution when there are more eligible users than available licenses.

8. The method of claim 1, wherein determining the resolution to the conflict comprises obtaining user input when the particular user qualifies for two or more incompatible licenses.

9. The method of claim 1, further comprising retracting the particular license from the particular user as a function of a change of one or more user attributes of the particular user.

10. A computer system, comprising:
one or more processors; and
one or more computer-readable media having stored thereon computer-executable instructions that are executable by the one or more processors to cause the computer system to assign licenses to users, the computer-executable instructions including instructions that are executable by the one or more processors to cause the computer system to perform at least the following:
receive, from a remote computer system, a set of a plurality of software licenses assigned to an organization associated with the license management computer system;
identify one or more license rules that specify criteria for assigning licenses in the set of software licenses to users within the organization, at least one particular license rule specifying one or more values of at least one attribute that must be matched for the particular license rule to apply;
identify a particular user within the organization to which the particular license rule applies, based at least on determining that a value of an attribute associated with the particular user matches the one or more values of the at least one attribute specified by the particular license rule;
identify that a conflict exists with respect to assigning the particular license to the particular user, the conflict including at least one of a license incompatibility and license scarcity;
determine a resolution to the conflict based on at least one of user input and a rule-based conflict resolution; and
assign a particular license of the set software licenses to the particular user based at least on having identified the particular user within the organization to which the particular license rule applies and based at least on having determined the resolution to the conflict.

11. The computer system of claim 10, wherein the one or more values of the at least one attribute that must be matched for the particular license rule to apply comprises a user group membership.

12. The computer system of claim 10, wherein the one or more values of the at least one attribute that must be matched for the particular license rule to apply comprises a license group membership.

13. The computer system of claim 10, wherein the one or more values of the at least one attribute that must be matched for the particular license rule to apply comprises a security group membership.

14. The computer system of claim 10, the computer-executable instructions also including instructions that are executable by the one or more processors to cause the computer system to acquire the attribute associated with the particular user from a directory service.

15. The computer system of claim 10, wherein determining the resolution to the conflict comprises performing the rule-based conflict resolution when the particular user qualifies for two or more incompatible licenses.

16. The computer system of claim 10, wherein determining the resolution to the conflict comprises performing the rule-based conflict resolution when there are more eligible users than available licenses.

17. The computer system of claim 10, wherein determining the resolution to the conflict comprises obtaining user input when the particular user qualifies for two or more incompatible licenses.

18. The computer system of claim 10, the computer-executable instructions also including instructions that are executable by the one or more processors to cause the computer system to retract the particular license from the particular user as a function of a change of one or more user attributes of the particular user.

19. A computer program product comprising one or more hardware storage devices having stored thereon computer-executable instructions that are executable by one or more processors of a computer system to cause the computer system to assign licenses to users, the computer-executable instructions including instructions that are executable by the one or more processors to cause the computer system to perform at least the following:
receive, from a remote computer system, a set of a plurality of software licenses assigned to an organization associated with the license management computer system;
identify one or more license rules that specify criteria for assigning licenses in the set of software licenses to users within the organization, at least one particular license rule specifying one or more values of at least one attribute that must be matched for the particular license rule to apply;
identify a particular user within the organization to which the particular license rule applies, based at least on determining that a value of an attribute associated with the particular user matches the one or more values of the at least one attribute specified by the particular license rule;
identify that a conflict exists with respect to assigning the particular license to the particular user, the conflict including at least one of a license incompatibility and license scarcity;
determine a resolution to the conflict based on at least one of user input and a rule-based conflict resolution; and
assign a particular license of the set software licenses to the particular user based at least on having identified the particular user within the organization to which the particular license rule applies and based at least on having determined the resolution to the conflict.

20. The computer program product of claim 19, the computer-executable instructions also including instructions that are executable by the one or more processors to cause the computer system to retract the particular license from the particular user as a function of a change of one or more user attributes of the particular user.

* * * * *